(12) United States Patent
Qin et al.

(10) Patent No.: US 11,500,602 B2
(45) Date of Patent: Nov. 15, 2022

(54) DISPLAY METHOD, DISPLAY CONTROL METHOD, DISPLAY TERMINAL, SERVER AND DISPLAY SYSTEM

(71) Applicant: BOE TECHNOLOGY GROUP CO., LTD., Beijing (CN)

(72) Inventors: Yang Qin, Beijing (CN); Peng Li, Beijing (CN); Shuyi Li, Beijing (CN); Wenjuan Li, Beijing (CN); Guangyu Shao, Beijing (CN); Hong Wang, Beijing (CN); Yiming Lei, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/280,103

(22) PCT Filed: Apr. 30, 2020

(86) PCT No.: PCT/CN2020/088175
§ 371 (c)(1),
(2) Date: Mar. 25, 2021

(87) PCT Pub. No.: WO2021/217567
PCT Pub. Date: Nov. 4, 2021

(65) Prior Publication Data
US 2022/0113928 A1    Apr. 14, 2022

(51) Int. Cl.
*G06F 3/041* (2006.01)
*G06F 3/14* (2006.01)
*H04N 5/04* (2006.01)

(52) U.S. Cl.
CPC ............. *G06F 3/1446* (2013.01); *H04N 5/04* (2013.01)

(58) Field of Classification Search
None
See application file for complete search history.

(56) References Cited

U.S. PATENT DOCUMENTS

| 2015/0077365 A1* | 3/2015 | Sasaki | G06F 3/1446 |
| | | | 345/173 |
| 2016/0132174 A1* | 5/2016 | Yoo | G06F 3/0482 |
| | | | 345/173 |

FOREIGN PATENT DOCUMENTS

| CN | 101674364 A | 3/2010 |
| CN | 103236250 A | 8/2013 |
| CN | 105468327 A | 4/2016 |

(Continued)

*Primary Examiner* — Carl Adams
(74) *Attorney, Agent, or Firm* — Nath, Goldberg & Meyer; Joshua R Goldberg

(57) ABSTRACT

The present disclosure provides a display method, including: receiving a task list, the task list includes at least one display task, and the display task includes identification information of a video resource corresponding to the display task; displaying the video resource defined by a first target task according to the first target task, where the first target task is a display task, in which the identification information of the display terminal serving as a host is the same as that of a current display terminal; and sending a display trigger signal to a display terminal serving as a slave in the first target task, where the display trigger signal is for controlling the display terminal receiving the display trigger signal to display the video resource defined by the first target task. The present disclosure further provides a display control method, a display terminal, a server and a display system.

12 Claims, 9 Drawing Sheets

(56) References Cited

FOREIGN PATENT DOCUMENTS

| CN | 106293571 A | 1/2017 |
|---|---|---|
| CN | 207624306 U | 7/2018 |
| CN | 108429931 A | 8/2018 |
| CN | 109195000 A | 1/2019 |
| CN | 110399110 A | 11/2019 |

* cited by examiner

DISPLAY METHOD, DISPLAY CONTROL METHOD, DISPLAY TERMINAL, SERVER AND DISPLAY SYSTEM

This is a National Phase Application filed under 35 U.S.C. 371 as a national stage of PCT/CN2020/088175, filed Apr. 30, 2020, the content of which is hereby incorporated by reference in its entirety.

TECHNICAL FIELD

The present disclosure relates to the field of display technology, and in particular, to a display method, a display control method, a display terminal, a server, and a display system.

BACKGROUND

In some occasions where a large-screen display is needed, a spliced screen is needed. The spliced screen includes a plurality of display terminals, and in order to display a same picture, different display terminals in the same spliced screen need to display different parts in the picture.

SUMMARY

An object of the present disclosure is to provide a display method, a display control method, a display terminal, a server, and a display system.

As a first aspect of the present disclosure, there is provided a display method, including:

receiving a task list, the task list includes at least one display task, the display task includes identification information of a video resource corresponding to the display task, a start time of the display task and type information of the display task, a type of the display task includes splicing displaying, the task list further includes identification information of a display terminal serving as a host in the display task with the type of splicing displaying and identification information of a display terminal serving as a slave in the display task with the type of splicing displaying, and the display terminal serving as the host and the display terminal serving as the slave in the same display task belong to a same spliced screen;

displaying the video resource defined by a first target task according to the first target task, the first target task is a display task, in all display tasks of the task list, in which identification information of the display terminal serving as the host is the same as identification information of a current display terminal;

sending a display trigger signal to the display terminal serving as the slave in the first target task, the display trigger signal is used for controlling the display terminal receiving the display trigger signal to display the video resource defined by the first target task.

In some implementations, the display method further includes:

after sending the display trigger signal to the display terminal serving as the slave in the first target task, periodically sending synchronization information to the display terminal serving as the slave in the first target task so as to control the display terminal serving as the slave to display synchronously with the current display terminal.

In some implementations, a period of sending the synchronization information is less than a predetermined time interval, and the synchronization information includes progress information of displaying of the current display terminal.

In some implementations, a plurality of display terminals in the same spliced screen form a local area network, and during sending the display trigger signal to the display terminal serving as the slave in the display task defined by the first target task, the display trigger signal is broadcast in the local area network.

In some implementations, the display method further includes:

after receiving the task list, downloading and storing video resources to be displayed, which are defined by the task list, different video resources have different identification information.

In some implementations, the task list is a task list sent by a server, and during downloading and storing the video resources, to be displayed, defined by the task list, the video resources to be displayed are downloaded from the server through an internet.

In some implementations, the display method further includes:

displaying the video resource corresponding to the display task defined by the second target task according to the second target task, the second target task is a display task, with a type of stand-alone displaying, in the task list received by the current display terminal.

In some implementations, information carried in the task list further includes a validity period of each display task, and the display method further includes:

after the display task is executed, judging whether the display task is in the validity period;

in response to that the display task is within the validity period, repeatedly executing the display task.

In some implementations, the display method further includes:

in response to the display trigger signal sent by another display terminal, and displaying the video resource, corresponding to the display task, defined by the task list corresponding to the received display trigger signal.

As a second aspect of the present disclosure, there is provided a display method, including:

in response to a display trigger signal sent by a display terminal serving as a host in a display task, displaying a video resource defined by the display trigger signal, a current display terminal and the display terminal serving as the host belong to a same spliced screen.

In some implementations, the display method further includes:

in response to synchronization information sent by the display terminal serving as the host in the display task, displaying the video resource, which is currently displayed, in synchronization with the display terminal serving as the host.

In some implementations, a period of sending the synchronization information is less than a predetermined time interval, the synchronization information includes a displaying progress of the display terminal serving as the host displaying the video resource, and during displaying the video resource, currently being displayed, in synchronization with the display terminal serving as the host, the displaying progress is adjusted to be the same as that of the display terminal serving as the host.

In some implementations, the display method further includes:

receiving a task list, the task list includes at least one display task, the display task includes identification information of a video resource corresponding to the display task, a start time of the display task and type information of the display task, a type of the display task includes splicing displaying, and in response to that the type of the display task is splicing displaying, the task list further includes identification information of the display terminal serving as the host in the display task and identification information of a display terminal serving as a slave in the display task, and the display terminal serving as the host and the display terminal serving as the slave belong to the same spliced screen.

In some implementations, the display method further includes:

after receiving the task list, downloading video resources according to the task list.

In some implementations, the type of the display task further includes stand-alone displaying, and the display method further includes:

displaying the video resource corresponding to the display task defined by a third target task according to the third target task, the third target task is a display task with the type of stand-alone displaying in the task list received by the current display terminal.

As a third aspect of the present disclosure, there is provided a display control method, including:

sending a task list to a plurality of display terminals in a same spliced screen, the task list includes at least one display task, the display task includes identification information of a video resource corresponding to the display task, a start time of the display task and type information of the display task, the task list further includes identification information of the display terminal serving as a host in the display task with a type of splicing displaying and identification information of the display terminal serving as a slave in the display task with the type of splicing display, and the display terminal serving as the host and the display terminal serving as the slave belong to a same spliced screen.

In some implementations, in the task list, the display terminal whose identification information meets a predetermined condition is defined as the host in the display task.

In some implementations, the identification information of the display terminal is an ID number of the display terminal, and the predetermined condition is any one selected from following conditions:

with the largest ID number in all the display terminals executing the display task;

with the smallest ID number in all the display terminal executing the display task.

In some implementations, the display control method includes:

in response to a downloading request, sending the video resource to the display terminal.

In some implementations, the display control method further includes:

before sending the video resource to the display terminal, segmenting an initial video resources to obtain all video resources corresponding to splicing playing;

generating the task list according to display tasks corresponding to stand-alone displaying and splicing displaying.

In some implementations, the display control method further includes:

before generating the task list, determining a validity period for each display task, and the generated task list carries information of the validity period.

As a fourth aspect of the present disclosure, there is provided a computer-readable storage medium for storing an executable program capable of executing the display method according to the first or second aspect of the present disclosure when the executable program is called; or alternatively the display control method according to the third aspect of the present disclosure is capable of being executed when the executable program is called.

As a fifth aspect of the present disclosure, there is provided a display terminal, including:

one or more first processors;

a first storage module, configured to store an executable program, and when the executable program is called, cause the one or more first processors to execute the display method provided in the first aspect or the second aspect of the present disclosure;

a first I/O interface coupled between the first processor and the first storage module so as to realize information interaction between the first processor and the first storage module.

As a fourth aspect of the present disclosure, there is provided a spliced screen, including a plurality of the above-mentioned display terminals provided in the present disclosure.

As a sixth aspect of the present disclosure, there is provided a server, including:

one or more second processors;

a second storage module, configured to store an executable program, and when the executable program is called, cause the one or more first processors to execute the display control method provided in the present disclosure;

a second I/O interface coupled between the second processor and the second storage module so as to realize information interaction between the second processor and the second storage module.

As a seventh aspect of the present disclosure, there is provided a display system, including a server and a plurality of the above-mentioned display terminals provided in the present disclosure, and the server is the above-mentioned server provided in the present disclosure.

DESCRIPTION OF DRAWINGS

The accompanying drawings, which are included to provide a further understanding of the present disclosure and are incorporated in and constitute a part of this specification, and together with the description serve to explain the present disclosure, but do not constitute a limitation of the present disclosure. In the drawings.

DESCRIPTION OF EMBODIMENTS

The following detailed description of embodiments of the present disclosure refers to the accompanying drawings. It should be understood that the detailed description and specific embodiments are given by way of illustration and explanation only, not limitation to the present disclosure.

In the related art, in order to display a picture on a spliced screen, a real-time communication with a server is required to obtain a video resource to be displayed. When the communication between the display terminal in the spliced screen and the server is poor, the display terminal cannot acquire the video resource, and thus the video resource cannot be displayed normally.

Figure 1:
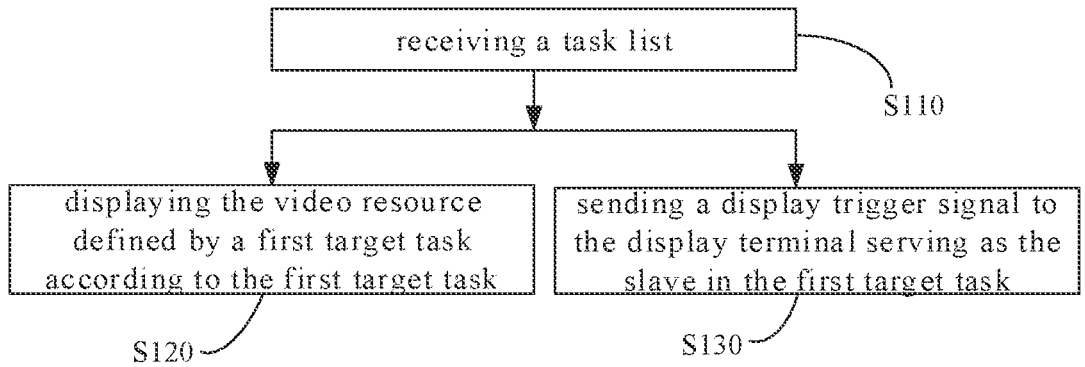
FIG. 1 is a flow chart of a first implementation of a display method provided in a first aspect of the present disclosure.

As an aspect of the present disclosure, there is provided a display method. It should be noted that the display method is executed by a display terminal, and the display terminal is a display terminal in a spliced screen. As shown in FIG. 1, the display method includes following steps S110 to S130.

Step S110, receiving a task list, where the task list includes at least one display task, and the display task includes identification information of a video resource corresponding to the display task, a start time of the display task, and type information of the display task, a type of the display task includes splicing displaying, the task list further includes identification information of a display terminal serving as a host in the display task with the type of splicing displaying, and identification information of a display terminal serving as a slave in the display task with the type of splicing displaying, and the display terminal serving as the host and the display terminal serving as the slave in the same display task belong to a same spliced screen.

Here, the spliced screen refers to a display device including a plurality of display terminals that can display a same picture collaboratively. In the spliced device, different display terminals respectively display different parts of the same picture.

The task list received by a current display terminal may be a task list sent by a server, or a task list copied to local of the display terminal through a storage medium such as a USB disk.

In the present disclosure, a specific form of the task list is not particularly limited. As an implementation, the task list may be a configuration file for configuring the display terminal, and carries information such as identification information of the video resource corresponding to the display task, the start time of the display task, type information of the display task, and a host-slave status (that is, the host in the display task or the slave in the display task) of each display terminal.

In the present disclosure, the identification information of the video resource is not particularly limited, as long as different video resources can be distinguished. For example, the identification information may be a name of the video resource, a number of the video resource, an address for downloading the video resource, and the like.

In the present disclosure, video resources having different identification information may have been stored in advance in the display terminal. After receiving the task list, the display terminal may compare the identification information of the locally stored video resource with the identification information (display information) of the video resource defined by each display task in the task list, so as to determine whether the video resource required by each display task is locally stored. When the video resource required by the display task is not stored locally, the video resource which is not stored locally in advance can be downloaded from Internet or the server.

Figure 5:
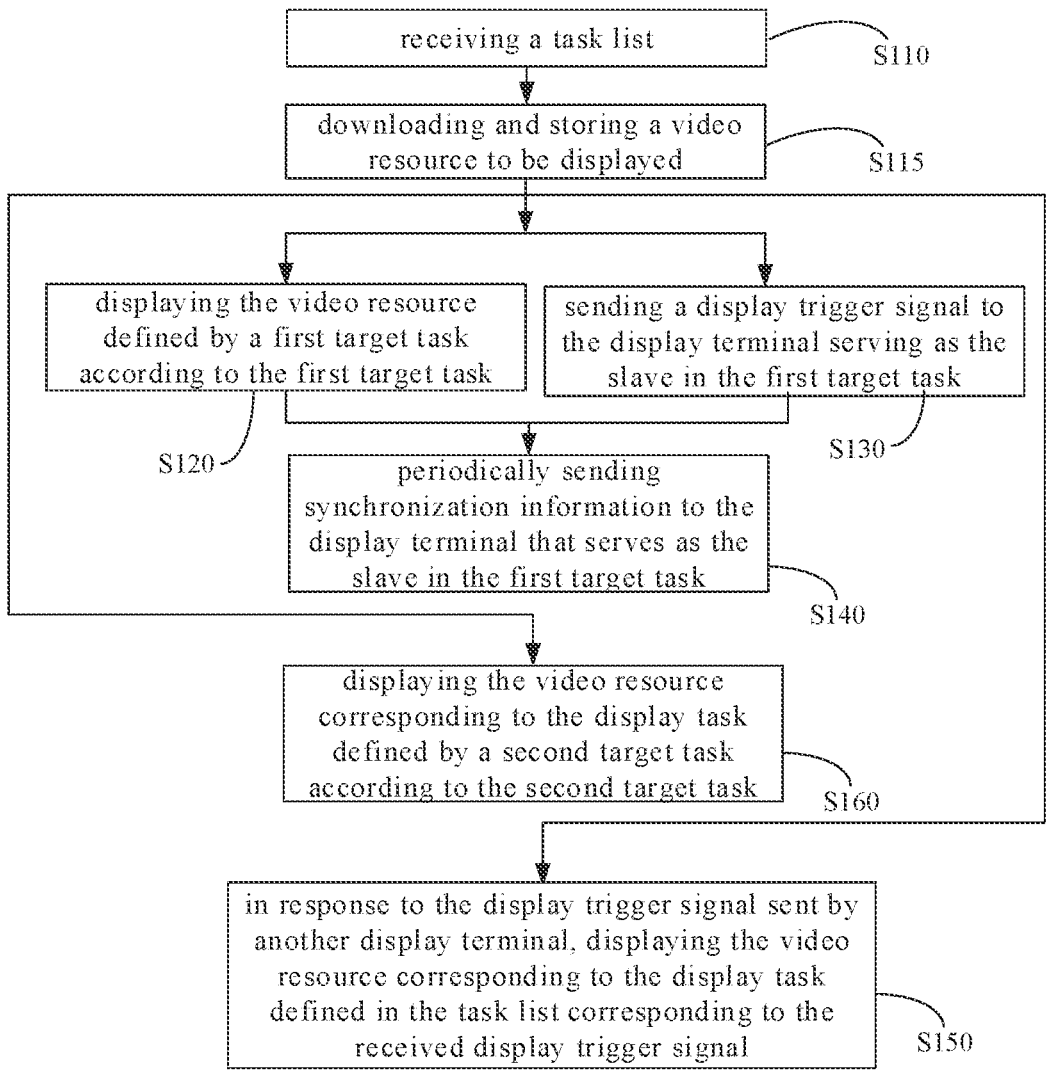
FIG. 5 is a flow chart of a fourth implementation of a display method provided in the first aspect of the present disclosure.

Certainly, the present disclosure is not limited thereto, and the display terminal may download the video resource required for executing each display task according to the task list after receiving the task list. Specifically, as shown in FIG. 5, the display method further includes a step of: S115, after receiving the task list, downloading and storing a video resource to be displayed, where different video resources have different identification information.

In the present disclosure, a way of downloading the video resource is not particularly limited. In order to ensure that the spliced screen displays a correct video resource, in some implementations, the task list and the video resource are provided by the server. Further, in the step S115, the video resource to be displayed is downloaded and stored from the server through Internet.

In the present disclosure, the number of video terminals required for each display task is not particularly limited. In each display task, the display terminal serving as the host and the display terminal serving as the slave may form a part of the spliced screen or form the whole spliced screen.

Step S120, displaying the video resource defined by a first target task according to the first target task, where the first target task is a display task, in which identification information of the display terminal serving as the host is the same as identification information of the current display terminal, in all display tasks of the task list.

It should be noted that "displaying the video resource defined by the first target task according to the first target task" as described herein may refer to displaying the video resource, locally stored, with identification information the same as the identification information defined by the first target task at a start time of the first target task. Certainly, besides limiting the video resource to be displayed and a displaying time, the display task may further limit other displaying parameters such as displaying mode and so on.

Step S130, sending a display trigger signal to the display terminal serving as the slave in the first target task, where the display trigger signal is used to control the display terminal that receives the display trigger signal to display the video resource defined by the first target task.

When the first target task exists in the received task list (that is, when a display task using the current display terminal as the host exists), the current display terminal not only displays the video resource defined by the first target task, but also sends the display trigger signal to the display terminal serving as the slave defined in the first target task, so as to control the display terminal serving as the slave to display a corresponding video resource.

For the whole spliced screen, the display terminal serving as the host and the display terminal serving as the slave can cooperate with each other to display a picture in a spliced mode.

Therefore, when a spliced display is realized by using the display method provided by the present disclosure, in the steps S120 and S130, each display terminal does not need to communicate with the server, and thus a network bandwidth cost is reduced. In the spliced screen, the displaying time of the slave always keeps up with the displaying time of the host, so that all screens of the spliced screen always display synchronously, even if the network between the server and the display terminal is disconnected, normal displaying of the spliced screen including the display terminal cannot be influenced, and a content synchronization efficiency is ensured.

In the present disclosure, different display terminals in the same spliced screen may form a local area network and communicate according to a local area network protocol. Certainly, the present disclosure is not limited thereto, and different display terminals in the same spliced screen may communicate through Internet or mobile communication.

In the present disclosure, when the display terminals in the same spliced screen form a local area network, there is no special limitation on how to send the display trigger signal to the slave. As an implementation, the display trigger signal may be sent to each slave in a unicast manner. As another implementation, the display trigger signal may be sent to each slave in a broadcast manner.

Alternatively, the broadcast may be in a form of UDP broadcast.

Figure 2:
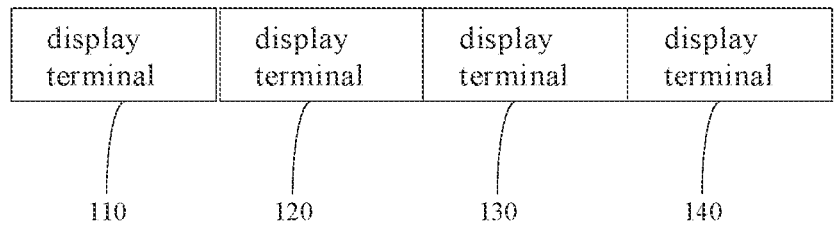
FIG. 2 is a schematic diagram of a spliced screen formed by splicing a plurality of display terminals.

The principle of the display method will be explained below by taking an example in which the task list includes a 1 # task, a 2 # task and a 3 # task, and the display terminals include a display terminal 110, a display terminal 120, a display terminal 130, and a display terminal 140 (as shown in FIG. 2). The task list received by the current display terminal includes following information:

in the #1 task, the display terminal 110 serves as the host, and the display terminals 120, 130 and 140 each serve as the slave; the start time of the 1 # task is 0 min (minute) 0 sec (second); in the #1 task, the identification information of the video resource to be displayed is 001; in the #2 task, the display terminal 120 serves as the host, and the display terminals 110, 130 and 140 each serve as the slave; the start time of the #2 task is 5 min 0 sec; in the #2 task, the identification information of the video resource to be displayed is 002; in the #3 task, the display terminal 130 serves as the host, and the display terminals 110, 120 and 140 each serve as the slave; the start time of the 3 # task is 10 min 0 sec; in the #3 task, the identification information of the video resource to be displayed is 003; in #4 task, the display terminal 140 serves as the host, and the display terminals 110, 120 and 130 each serves as the slave; the start, time of the #4 task is 15 min and 0 sec; in the #4 task, the identification information of the video resource to be displayed is 004.

For the display terminal 110, the 1 # task is the first target task. After receiving the task list, the display terminal 110 displays the video resource with the identification information being 001 at 0 min and 0 sec, and sends a display trigger signal including the identification information being 001 of the video resource to each display terminal serving as the slave, so as to control said each display terminal serving as the slave to display the video resource with the identification information being 001.

For the display terminal 120, the 2 # task is the first target task. After receiving the task list, the display terminal 120 displays the video resource with the identification information being 002 at 5 min and 0 sec, and sends a display trigger signal including the identification information being 002 of the video resource to each display terminal serving as the slave.

For the display terminal 130, the 3 # task is the first target task. After receiving the task list, the display terminal 130 displays the video resource with the identification information being 003 at 10 min and 0 sec, and sends a display trigger signal including the identification information being 003 of the video resource to each display terminal serving as the slave, so as to control said each display terminal serving as the slave to display the video resource with the identification information being 003.

For the display terminal 140, the 4 # task is the first target task. After receiving the task list, the display terminal 140 displays the video resource with identification information being 004 at 15 min and 0 sec, and sends a display trigger signal including the identification information being 004 of the video resource to each display terminal serving as the slave, so as to control said each display terminal serving as the slave to display the video resource with identification information being 004.

In theory, displaying progresses of all the display terminals (including the display terminal serving as the host and the display terminal serving as the slave) that perform the same display task should be the same.

Figure 3:
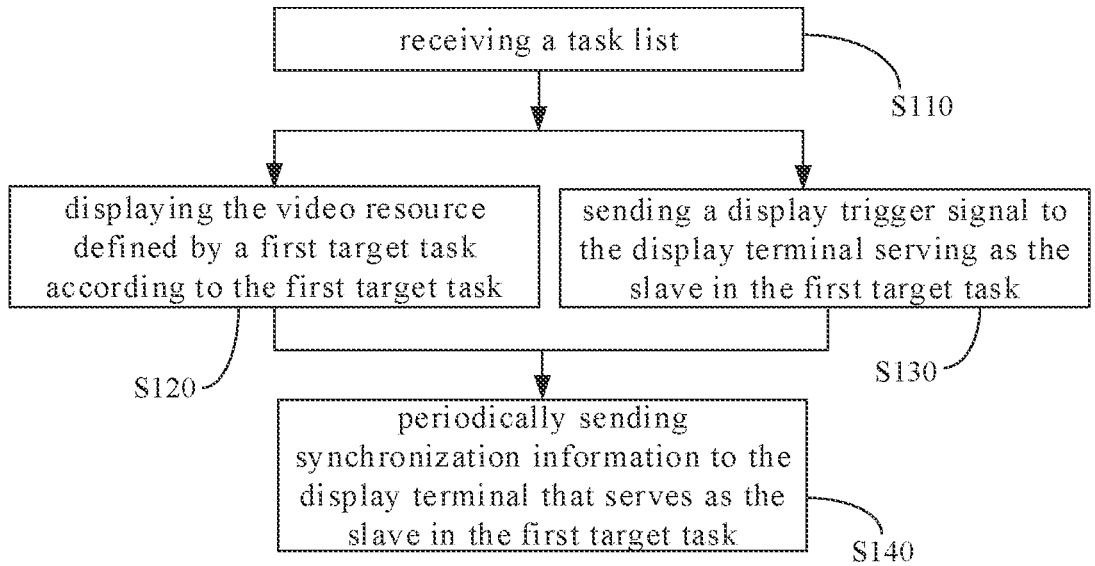
FIG. 3 is a flow chart of a second implementation of a display method provided in the first aspect of the present disclosure.

In order to ensure that the host and the slave involved in the first target task can display the video resource synchronously, in some implementations, as shown in FIG. 3, the display method further includes a step of: S140, after the step S130, periodically sending synchronization information to each display terminal that serves as the slave in the first target task to control each display terminal that serves as the slave to display in synchronization with the current display terminal.

After the display terminal serving as the slave in the first target task receives the synchronization information, it can display the video resource synchronously with the current display terminal (i.e., the display terminal serving as the host).

In the present disclosure, a specific form of the synchronization information is not particularly limited, as long as the display terminals can be controlled to display synchronously.

As an implementation, a period of sending the synchronization information is less than a predetermined time interval, and the synchronization information includes progress information of displaying of the current display terminal. The display terminal receiving the synchronization information can adjust the displaying progress thereof to be consistent with the displaying progress carried in the synchronization information.

In the present disclosure, the predetermined time interval is not particularly limited, as long as it is possible to ensure that contents displayed by the display terminal serving as the host and the display terminal serving as the slave are not visually perceived as inconsistent. That is, the predetermined time interval should be less than a duration (about 10 ms to 25 ms) of a frame of 30 fps video resource.

The step S140 can be regarded as a verification mechanism for displaying content in real time, all the display terminals in the same display task use the host as a displaying standard, the host sends a current displaying time thereof to all the display terminals in real time, with a message transmission interval less than a preset time interval, so that the host promotes all the display terminals each serving as the slave to display. When the preset time interval is small enough, a delay correction compensation of all the display terminals in a group can be met, and it is ensured that a synchronization delay does not appear to be obvious to naked eyes, and when the preset time interval is small enough, a real-time synchronous displaying of 60 fps video resource by different display terminals can be realized.

The steps of the display method when the current display terminal is serving as the host are described above. The following describes the steps of the display method when the current display terminal is serving as the slave (i.e., receiving a display trigger signal sent by another display terminal).

Figure 4:
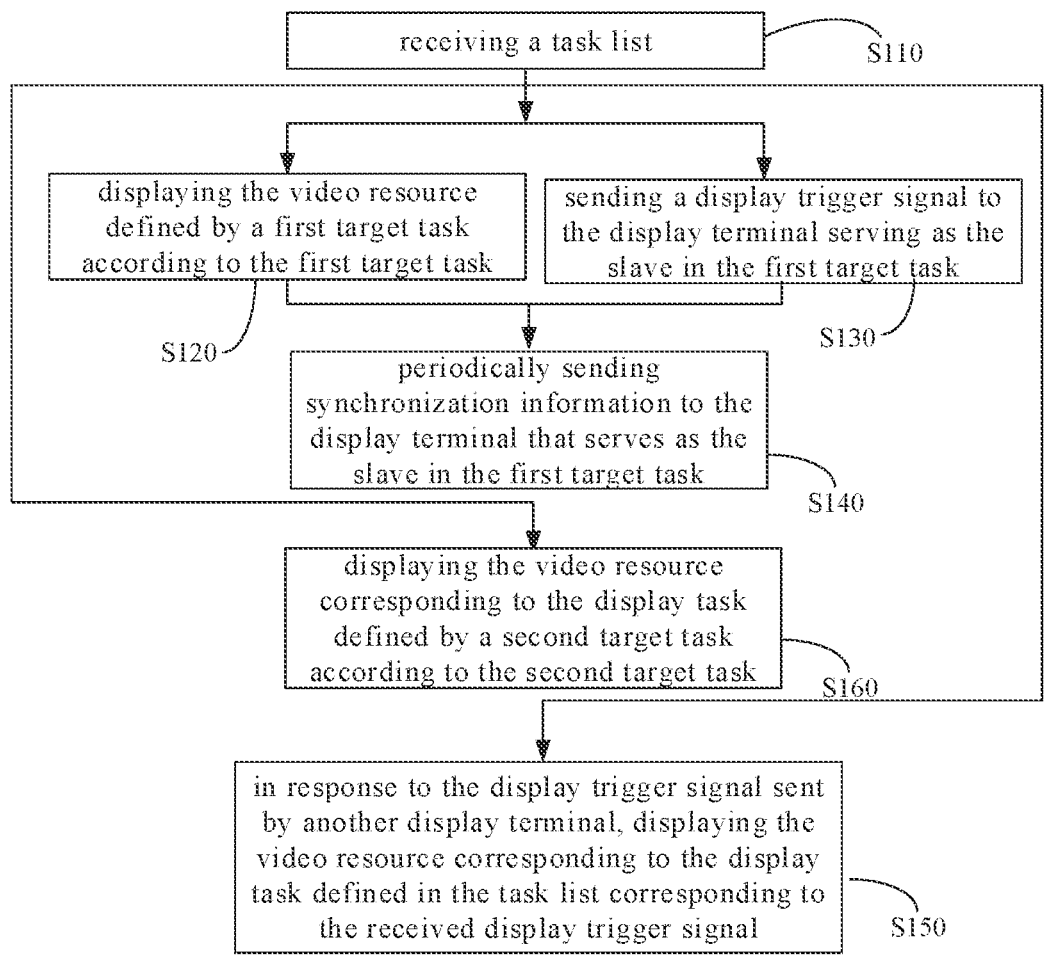
FIG. 4 is a flow chart of a third implementation of a display method provided in the first aspect of the present disclosure.

Specifically, as shown in FIG. 4, the display method further includes a step of: S150, in response to the display trigger signal sent by another display terminal, displaying the video resource corresponding to the display task defined in the task list corresponding to the received display trigger signal.

Besides splicing displaying, the type of the display task may further include stand-alone displaying, and the steps included in the display method when the type of the display task is splicing displaying are introduced above. The following describes specific steps of the display method when the type of the display task is stand-alone displaying.

Specifically, when the type of the display task is stand-alone displaying, the display method may include a step of: S160, displaying the video resource corresponding to the display task defined by a second target task according to the second target task, where the second target task is a display task, with the type of stand-alone displaying, in the task list received by the current display terminal.

In the present disclosure, the number of times each display task is executed is not particularly limited. In some implementations, different video resources are displayed during different time durations in order to achieve different display purposes of the spliced screen. For example, during a holiday, a video resource corresponding to a holiday theme of the holiday is displayed.

A plurality of different display tasks may be stored in the display terminal, and in order to avoid incorrect displaying, in some implementations, the information carried by the task list further includes a validity period of each display task, and the display method further includes steps of: S170, after the display task is executed, determining whether the display task is within the validity period; and S180, in response to that the display task is within the validity period, repeatedly executing the display task.

In the present disclosure, the validity period of each display task is not particularly limited. In general, the validity period may be defined according to a duration of the holiday.

For example, if the holiday of a certain festival is one week, the validity period of the display task corresponding to the festival may be one week.

Figure 6:
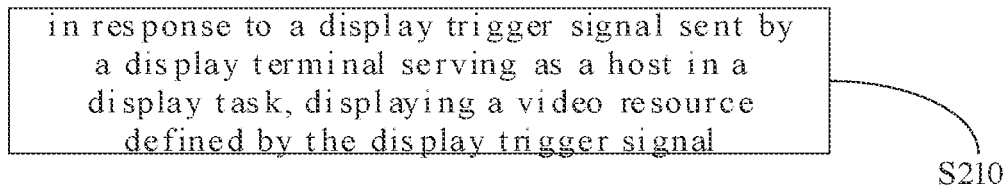
FIG. 6 is a flow chart of a first implementation of a display method provided in a second aspect of the present disclosure.

As a second aspect of the present disclosure, there is provided a display method, as shown in FIG. 6, including a step of: S210, in response to a display trigger signal sent by a display terminal serving as a host in a display task, displaying a video resource defined by the display trigger signal.

The display method provided by the second aspect is still executed by the display terminal in a spliced screen, and the current display terminal and the display terminal serving as the host belong to a same spliced screen. The display terminal serving as the host and a display terminal serving as a slave together perform a same display task, which may be the display task defined in the task list, as described above.

Similar to the above, the video resource to be displayed may be stored in the display terminal in advance. The display trigger signal can control the display terminal receiving the display trigger signal to display the corresponding video resource. Correspondingly, the display trigger signal may carry identification information of the video resource, and after receiving the display trigger signal, the current display terminal confirms the identification information carried by the display trigger signal, and displays the video resource corresponding to the identification information.

It should be noted that the display terminal serving as the host displays the video resource with the same identification information as that displayed by the current display terminal, so as to implement the splicing displaying.

Figure 7:
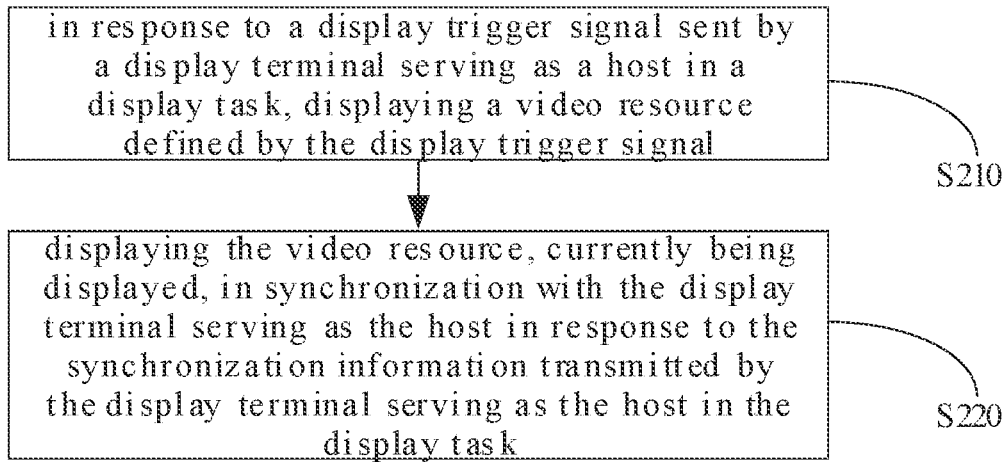
FIG. 7 is a flow chart of a second implementation of a display method provided in the second aspect of the present disclosure.

As described above, in order to ensure that the display terminal serving as the host displays in synchronization with the display terminal serving as the slave, in some implementations, the display terminal serving as the host may send synchronization information to the display terminal serving as the slave. Accordingly, as shown in FIG. 7, the display method further includes a step of: S220, displaying the video resource, currently being displayed, in synchronization with the display terminal serving as the host in response to the synchronization information sent by the display terminal serving as the host in the display task.

As described above, in some implementations, the synchronization information includes a displaying progress of the display terminal serving as the host displaying the video resource, and accordingly, step S220 specifically includes adjusting the displaying progress to be the same as the displaying progress of the display terminal serving as the host.

In some implementations, the display method may further include a step of: S200, receiving a task list, where the task list includes at least one display task, and the display task includes identification information of a video resource corresponding to the display task, a start time of the display task, and type information of the display task, the type of the display task includes splicing displaying, the task list further includes identification information of the display terminal serving as the host in the display task with the type of splicing displaying, and identification information of the display terminal serving as the slave in the display task with the type of splicing displaying, and the display terminal serving as the host and the display terminal serving as the slave belong to a same spliced screen.

Figure 8:
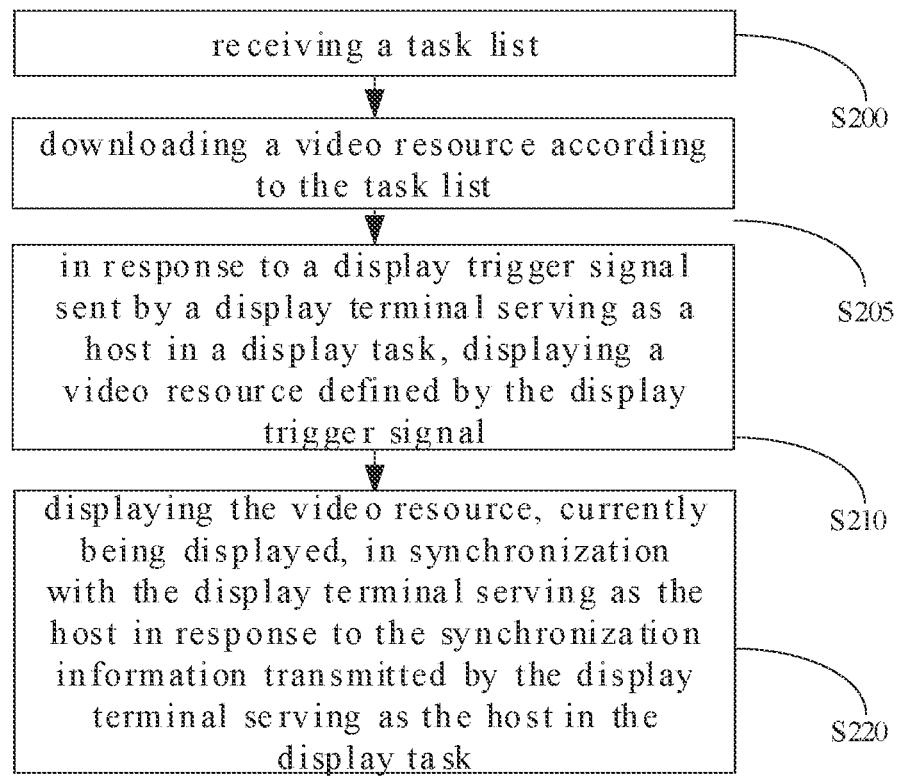
FIG. 8 is a flow chart of a third implementation of a display method provided in the second aspect of the present disclosure.

In the present disclosure, how to obtain the video resource to be displayed is not particularly limited, and the video resource to be displayed may be downloaded through Internet, or may be copied to the local through a storage medium such as USB disk. When downloading the video resource through Internet, as shown in FIG. 8, the display method further includes a step of: S205, after the step S200, downloading a video resource according to the task list.

In the present disclosure, the video resource may be downloaded from a server that sends the task list.

The type of the display task executed by the current display terminal when the current display terminal displays the video resource according to the display trigger signal is splicing displaying.

Correspondingly, when the received task list includes a display task with the type of stand-alone displaying, the display method may further include a step of: S230, displaying the video resource corresponding to the display task defined by a third target task according to the third target task, where the third target task is a display task with the type of stand-alone displaying in the task list received by the current display terminal.

Similar to the display method provided in the first aspect of the present disclosure, when the displaying of the third target task is finished, it may be further determined whether the validity period of the third target task is expired. When the validity period of the third target task is not expired, the third target task is continuously executed. When the validity period of the third task is expired, the third target task is no longer executed.

Both aspects above describe steps performed by the display terminal, Steps performed by the server will be described below.

Figure 9:
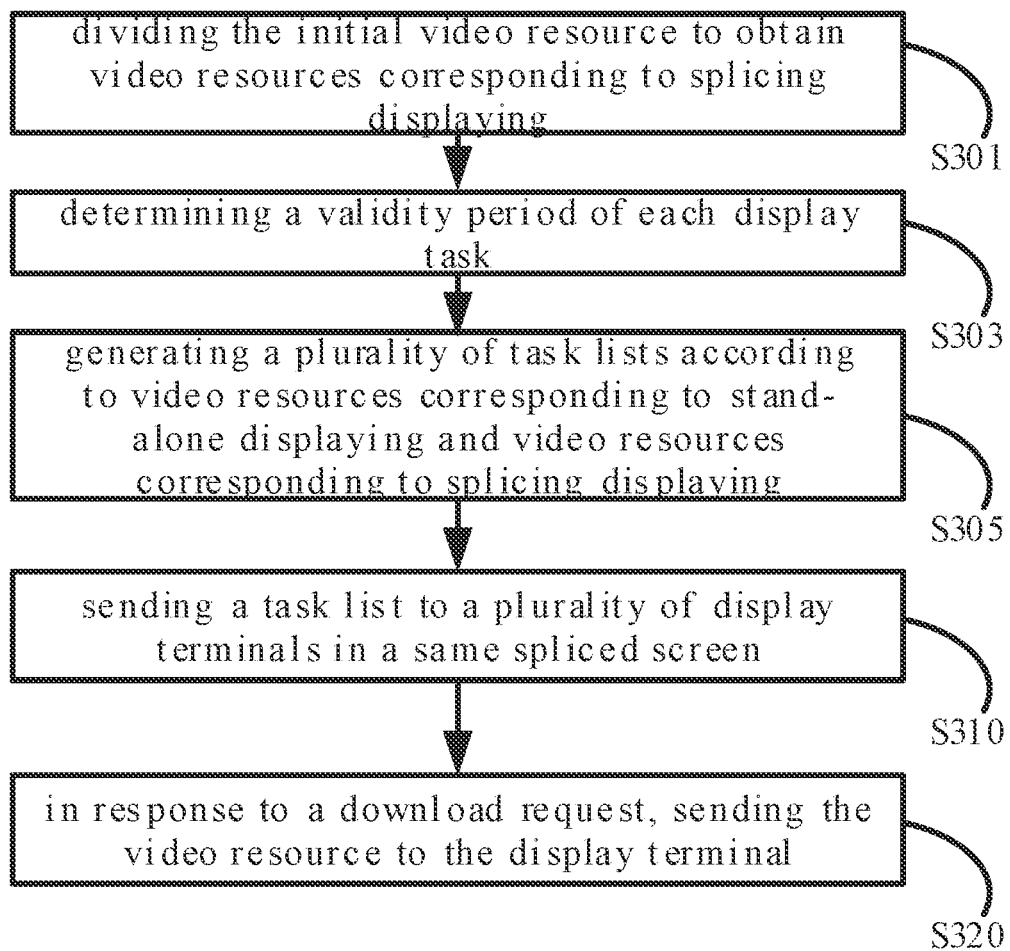
FIG. 9 is a flowchart of a first implementation of a display control method provided in a third aspect of the present disclosure.

As a third aspect of the present disclosure, there is provided a display control method, as shown in FIG. 9, including a step of: S310, sending a task list to a plurality of display terminals in a same spliced screen, where the task list includes at least one display task, and the display task includes identification information of a video resource corresponding to the display task, a start time of the display task, and type information of the display task, the type of the display task includes splicing displaying, and the task list further includes identification information of a display terminal serving as a host in the display task with the type of splicing displaying, and identification information of a display terminal serving as a slave in the display task with the type of splicing displaying.

In the present disclosure, the server issues the task list to each display terminal in the spliced screen through step S310, and after each display terminal receives the task list, said each display terminal in the spliced screen can execute each display task according to the task list without maintaining communication with the server, so that smooth displaying of the spliced screen can be ensured.

In the present disclosure, how to select the host in the display task is not particularly limited, and as an implementation, the display terminal with identification information satisfying a predetermined condition is defined to be the host in the display task. That is, the server selects the host in the display task according to a particular election policy.

In the present disclosure, the predetermined condition is not particularly limited. For example, the identification information of the display terminal is an ID number of the display terminal, and the predetermined condition is any one selected from following conditions:

with the largest ID number in all the display terminals executing the display task;

with the smallest ID number in all the display terminal executing the display task.

It should be noted that, in a same spliced screen, numbers of different display terminals are different. Among a plurality of display terminals having different ID numbers, it is determined that the display terminal having the largest ID number exists, and it is also determined that the display terminal having the smallest ID number exists. Therefore, the display terminal serving as the host in each display task can be reliably and quickly determined using the predetermined condition described above.

As described above, the display terminal may download the video resource from the server through Internet. Accordingly, the display control method may further include a step of: S320, in response to a download request, sending the video resource to the display terminal.

In the present disclosure, the type of the display task in the task list issued by the server may be stand-alone displaying or splicing displaying.

Correspondingly, the server may divide an initial video resource and send divided video resources to the display terminal.

Specifically, before sending the video resource to the display terminal, the display control method may further include steps of:

S301, dividing the initial video resource to obtain video resources corresponding to splicing displaying;

S305, generating a plurality of task lists according to video resources corresponding to stand-alone displaying and video resources corresponding to splicing displaying.

As described above, the task list may carry information of validity period of each display task. Accordingly, the display control method may further include a step of: S303, before the step S305, determining a validity period of each display task.

Accordingly, the task list generated in step S305 carries the information of the validity period.

As a fourth aspect of the present disclosure, there is provided a computer-readable storage medium for storing an executable program capable of executing the display method provided by the first aspect of the present disclosure when the executable program is called.

In some implementations, the display method provided by the second aspect of the present disclosure can be executed when the executable program is called.

In some implementations, when the executable program is called, the above display control method provided by the present disclosure can be executed.

It will be understood by those of ordinary skill in the art that all or some of steps of the method, functional modules/units in the system or device disclosed above may be implemented as software, firmware, hardware, or suitable combinations thereof. In a hardware implementation, a division between functional modules/units mentioned in the above description does not necessarily correspond to a division of physical components; for example, one physical component may have multiple functions, or one function or step may be performed by several physical components in cooperation. Some or all of the physical components may be implemented as software executed by a processor, such as central processing unit, digital signal processor, or microprocessor, or may be implemented as hardware, or an integrated circuit, such as application specific integrated circuit. Such software may be distributed on computer readable medium, which may include computer storage medium (or non-transitory medium) and communication medium (or transitory medium). As well known to those ordinary skilled in the art, the term of computer storage medium includes volatile and nonvolatile, removable and non-removable medium implemented in any method or technology for storing information such as computer readable instructions, data structures, program modules or other data. The computer storage medium includes, but is not limited to, RAM, ROM, EEPROM, flash memory, CD-ROM, digital versatile disk (DVD) or other optical disk storage, magnetic cassettes, magnetic tape, magnetic disk storage or other magnetic storage devices, or any other medium which can be used to store desired information and can accessed by a computer. In addition, as well known to those skilled in the art, the communication medium typically includes computer readable instructions, data structures, program modules or other data in a modulated data signal such as carrier wave or other transport mechanism and includes any information delivery medium.

As a fifth aspect of the present disclosure, there is provided a display terminal, including:

one or more first processors;

a first storage module, configured to store an executable program, and when the executable program is called, the one or more first processors execute the display method provided by the first aspect of the present disclosure or the display method provided by the second aspect of the present disclosure;

the display terminal further includes a first I/O interface (read-write interface), and the first I/O interface is coupled between the first processor and the first storage module so as to realize information interaction between the first processor and the first storage module.

The first processor is a device with data processing capability, including but not limited to a central processing unit (CPU) or the like; the first storage module is a device with data storage capability, which includes, but is not limited to, random access memory (RAM, in particular, SDRAM, DDR, etc.), read only memory (ROM), electrically erasable programmable read only memory (EEPROM), flash memory (FLASH).

The first I/O interface is coupled between the first processor and the first storage module, can implement information interaction between the first processor and the first storage module, and includes but is not limited to a data bus and the like.

In some implementations, the first processor, the first storage module, and the first I/O interface are intercoupled via a bus to further interface with other components of the display terminal.

As a sixth aspect of the present disclosure, there is provided a spliced screen, the spliced screen includes a plurality of display terminals each provided by the present disclosure.

As described above, the display terminals constitute a local area network. In the present disclosure, a networking mode of the local area network is not particularly limited. For example, the local area network between different display terminals in the spliced screen may be a wireless local area network or a wired local area network.

In the present disclosure, different display terminals are numbered differently.

In the present disclosure, a shape of the display terminal is not particularly limited. For example, the display terminal may be a rectangular display terminal, and shapes of the display terminals in the spliced screen are the same. Accordingly, the display terminals may be arranged in a matrix of rows and columns.

As a seventh aspect of the present disclosure, there is provided a server including:

one or more second processors;

a second storage module, configured to store an executable program, and when the executable program is called, the one or more first processors execute the display control method provided in the present disclosure;

a second I/O interface coupled between the second processor and the second storage module so as to realize information interaction between the second processor and the second storage module.

The second processor is a device with data processing capability, including but not limited to a central processing unit (CPU) or the like; the first storage module is a device with data storage capability, which includes, but is not limited to, random access memory (RAM, in particular, SDRAM, DDR, etc.), read only memory (ROM), electrically erasable programmable read only memory (EEPROM), flash memory (FLASH).

The second I/O interface is coupled between the second processor and the second storage module, can implement information interaction between the second processor and the second storage module, and includes but is not limited to a data bus and the like.

In some embodiments, the second processor, the second storage module, and the second I/O interface are coupled to each other through a bus, and further coupled to other components of the display terminal.

Figure 15:
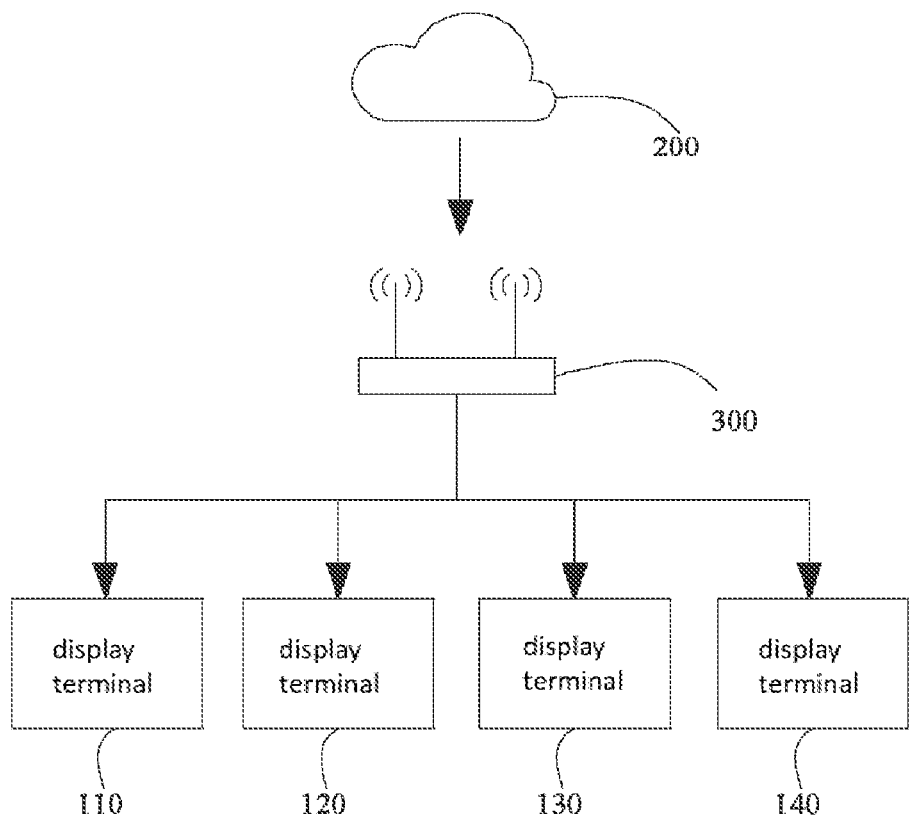
FIG. 15 is a schematic diagram of a display system provided by the present disclosure.

As an eighth aspect of the present disclosure, there is provided a display system, as shown in FIG. 15, including a server 200 and a plurality of display terminals, where the display terminals are the above-mentioned display terminals provided by the present disclosure, and the server is the above-mentioned server provided by the present disclosure.

In FIG. 15, four display terminals, including a display terminal 110, a display terminal 120, a display terminal 130, and a display terminal 140 are shown. As an implementation, each display terminal accesses to network through a router 300 and communicates with the server 200.

As an implementation, the server and the display terminal may transmit data via HTTP protocol and/or MQTT protocol.

Figure 10:
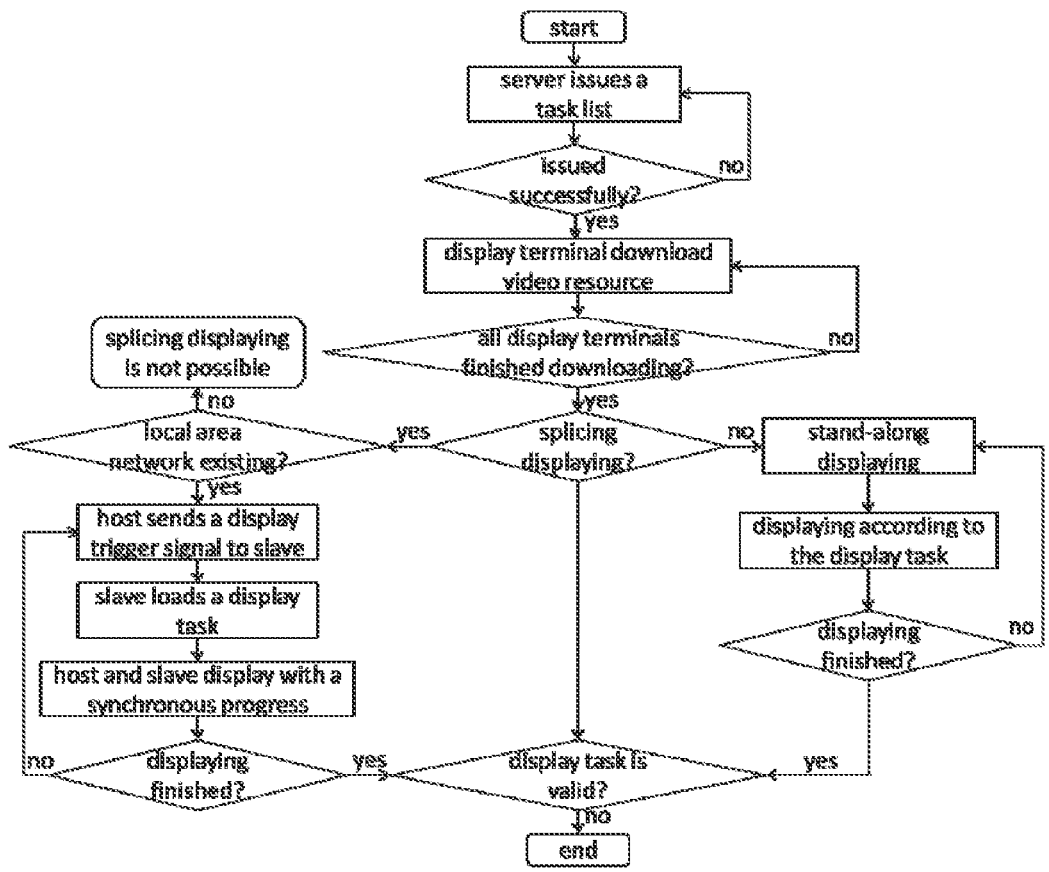
FIG. 10 is a schematic diagram illustrating operations of a display system provided by the present disclosure.

Specific operations of the display system provided by the present disclosure will be described below with reference to FIG. 10.

The Operations Include:

the server issues a task list;

if an issuing of the task list fails, issuing the task list again;

after the task list is successfully issued, the display terminal downloads a video resource;

after all the display terminals finish downloading video resources, judging whether the type of the display task executed by each of the display terminals is splicing displaying or not according to the task list;

when the type of the display task is judged as stand-alone displaying, the display terminal stand-alone displays a corresponding video resource;

when it is judged that a display task with type of splicing displaying exists, the display terminal further judges whether a local area network exists among the display terminals of the spliced screen;

when a local area network exists among the display terminals of the spliced screen, the display terminal serving as a host sends a display trigger signal to the display terminal serving as a slave;

after receiving the display trigger signal, the display terminal serving as the slave loads a corresponding display task;

during splicing displaying, the display terminal serving as the host sends synchronization information to the display terminal serving as the slave so as to control the display terminals executing a same display task to display synchronously;

after stand-alone displaying and splicing displaying are both finished, judging whether the corresponding display task is in a validity period or not;

if the validity period is expired, finishing displaying;

if the display task is still in the validity period, repeatedly executing the display task.

In the present disclosure, the display terminals of the spliced screen may execute a display task together, or the display terminals of the spliced screen may execute a plurality of display tasks simultaneously.

A specific manner in which the spliced screen performs the display task is described below in connection with implementations shown in FIG. 11 to FIG. 14.

Figure 11:
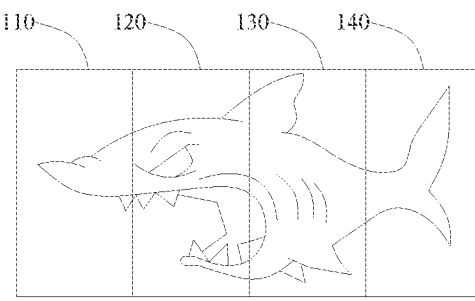
FIG. 11 is a schematic diagram illustrating a display screen when four display terminals execute a same display task.

In the implementation shown in FIG. 11, the task list includes one display task. The type of the display task is splicing displaying, and the video resource to be displayed is an initial video resource (shark predation) with identification information of 1 #. Before issuing video resources, the server firstly divides the 1 # initial video resource to obtain four video resources to be displayed, and the identification information of each of the four video resources to be displayed is 1 #. After the division is completed, the server uses one of the four display terminals with the largest ID number (i.e., display terminal 140) as a host and the remaining display terminals (i.e., display terminal 110, display terminal 120, and display terminal 130) each as the slave. Subsequently, the server generates a task list according to above information and issues the task list.

After the display terminal 110, the display terminal 120, the display terminal 130 and the display terminal 140 receive the task list, the display terminal 140 determines that it is the host. The display terminal 140 displays the 1 # video resource, and sends a display trigger signal carrying the 1 # identification information to the display terminal 110, the display terminal 120, and the display terminal 130, so that the display terminal 110, the display terminal 120, and the display terminal 130 all display the 1 # video resource, and finally, the splicing displaying is implemented.

Figure 12:
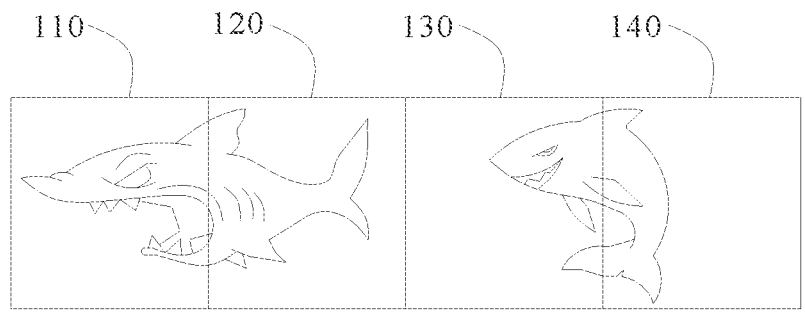
FIG. 12 is a schematic diagram illustrating that when four display terminals respectively execute two display tasks and each display task relates to two display terminals, the two display tasks display different pictures.

In the implementation shown in FIG. 12, the task list includes two display tasks. The two display tasks are both of the type of splicing displaying. In the two display tasks, the video resources to be displayed are respectively an initial video resource (shark predation) with the identification information of 1 # and an initial video resource (shark swimming) with the identification information of 2 #. Before generating the task list, the server firstly divides the 1 # initial video resource and the 2 # initial video resource. Specifically, the 1 # initial video resource is divided into two video resources, to be displayed, with identification information being 1 #, and the 2 # initial video resource is divided into two video resources, to be displayed, with identification information being 2 #. The server determines the display terminal 110 and the display terminal 120 as display terminals displaying the display task corresponding to the 1 # video resource, determines the display terminal 120 as the host, and determines the display terminal 110 as the slave. The server determines the display terminal 130 and the display terminal 140 as display terminals displaying the display task corresponding to the 2 # video resource, determines the display terminal 140 as the host, and determines the display terminal 130 as the slave. Subsequently, the server generates the task list according to above information and issues the task list.

After the display terminal 110, the display terminal 120, the display terminal 130 and the display terminal 140 receive the task list, each of the display terminal 120 and the display terminal 140 determines that it is the host. The display terminal 120 displays the 1 # video resource and sends a display trigger signal carrying the identification information being 1 # to the display terminal 110 to control the display terminal 110 to display the 1 # video resource. The display terminal 140 displays the 2 # video resource and sends a display trigger signal carrying the identification information being 2 # to the display terminal 130 to control the display terminal 130 to display the 2 # video resource.

Figure 13:
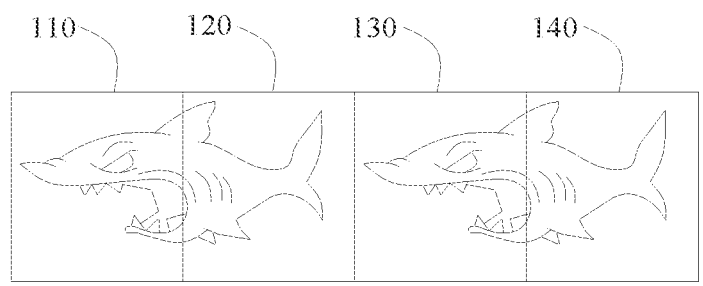
FIG. 13 is a schematic diagram illustrating that when four display terminals respectively execute two different display tasks and each display task relates to two display terminals, the two display tasks display a same picture.

In the implementation shown in FIG. 13, the task list includes two display tasks. The two display tasks are both of the type of splicing playing. In the two display tasks, the video resources to be displayed are all initial video resources (shark predation) with identification information being 1 #. Before generating the task list, the server firstly divides the 1 # initial video resource. Specifically, the 1 # initial video resource is divided into two video resources to be displayed with identification information being 1 #. The server determines the display terminal 110 and the display terminal 120 as display terminals displaying a display task corresponding to the 1 # video resource, determines the display terminal 120 as the host, and determines the display terminal 110 as the slave. The server determines the display terminal 130 and the display terminal 140 as display terminals displaying another display task corresponding to the 1 # video resource, determines the display terminal 140 as the host, and determines the display terminal 130 as the slave. Subsequently, the server generates the task list according to above information and issues the task list.

After the display terminal 110, the display terminal 120, the display terminal 130 and the display terminal 140 receive the task list, each of the display terminal 120 and the display terminal 140 determines that it is the host. The display terminal 120 displays the 1 # video resource and sends a display trigger signal carrying identification information being 1 # to the display terminal 110 to control the display terminal 110 to display the 1 # video resource. The display terminal 140 displays the 1 # video resource and sends a display trigger signal carrying identification information being 1 # to the display terminal 130 to control the display terminal 130 to display the 1 # video resource.

Figure 14:
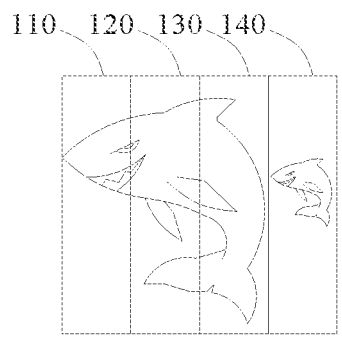
FIG. 14 is a schematic diagram illustrating that when four display terminals respectively execute two display tasks, and one display task relates to three display terminals, and the other display task relates to one display terminal, the two display tasks display a same picture.

In the implementation shown in FIG. 14, the task list includes two display tasks. The two display tasks are of the type of splicing displaying and the type of stand-alone displaying, respectively. In the two display tasks, the video resources to be displayed are initial video resources (shark swimming) with identification information being 2 #. Before generating the task list, the server firstly divides the 2 # initial video resource. Specifically, the 2 # initial video resource is divided into three video resources to be displayed with identification information being 1 #. The server determines the display terminal 110, the display terminal 120 and the display terminal 130 as display terminals for displaying a display task corresponding to the 2 # video resource in a splicing displaying mode, determines the display terminal 130 as the host and determines the display terminal 110 and the display terminal 120 each as the slave. The server determines the display terminal 140 as a display terminal displaying the 2 # initial video resource in a stand-alone displaying mode. Subsequently, the server generates the task list according to above information and issues the task list.

After the display terminal 110, the display terminal 120, the display terminal 130 and the display terminal 140 receive the task list, the display terminal 130 determines that it is the host, and the display terminal 140 displays the 2 # initial video resource. The display terminal 130 displays the 2 # video resource, and sends a display trigger signal carrying identification information being 2 # to the display terminal 110 and the display terminal 120 to control the display terminal 110 and the display terminal 120 to display the 2 # video resource.

Figure 16:
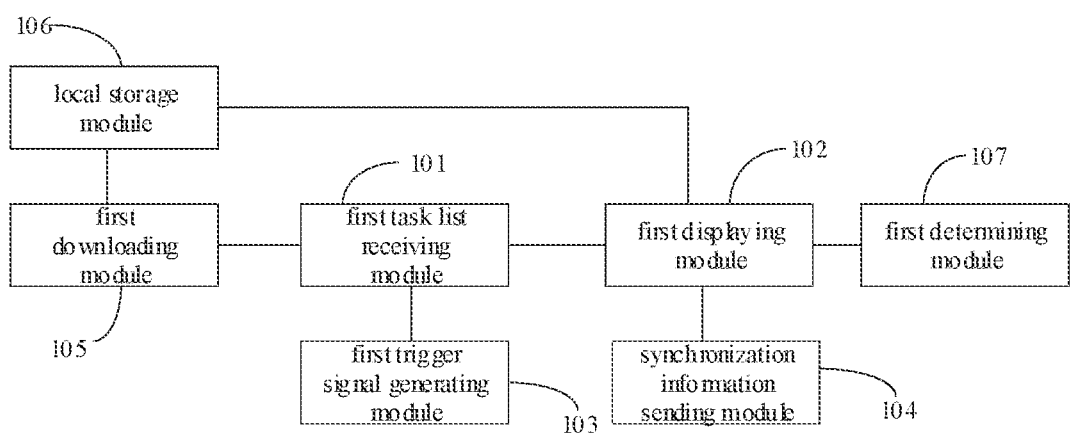
FIG. 16 is a block diagram illustrating an implementation of a display terminal provided by the present disclosure.

The present disclosure also provides a display terminal, as shown in FIG. 16, the display terminal includes a first task list receiving module 101, a first displaying module 102, and a first trigger signal generating module 103.

The first task list receiving module 101 is configured to receive a task list, where the task list includes at least one display task, and the display task includes identification information of a video resource corresponding to the display task, a start time of the display task, and type information of the display task, where the type of the display task includes stand-alone displaying and splicing displaying, the task list further includes identification information of a display terminal serving as a host in the display task with the type of splicing displaying, and identification information of a display terminal serving as a slave in the display task with the type of splicing displaying, and the display terminal serving as the host and the display terminal serving as the slave in a same display task belong to a same spliced screen.

The first displaying module 102 is configured to display, according to a first target task, a video resource defined by the first target task, where the first target task is a display task, in which identification information of the display terminal serving as the host is the same as that of a current display terminal, in all display tasks of the task list.

The first trigger signal generating module 103 is configured to send a display trigger signal to the display terminal that serves as the slave in the first target task, where the display trigger signal is used to control the display terminal that receives the display trigger signal to display a video resource defined in the first target task.

The display terminal may further include a synchronization information sending module 104, where the synchronization information sending module 104 is configured to periodically send synchronization information to the display terminal serving as the slave in the first target task, so as to control the display terminal serving as the slave to display in synchronization with the current display terminal.

In some implementations, the display terminal may further include a first downloading module 105, where the first downloading module 105 is configured to download the video resource, to be displayed, defined in the task list, and store the downloaded video resource in a local storage module 106.

In some implementations, the first displaying module 102 is further configured to display, according to a second target task, a video resource corresponding to a display task defined by the second target task, where the second target task is a display task with the type of stand-alone displaying in the task list received by the current display terminal.

In some implementations, the display terminal may further include a first determining module 107, where the first determining module 107 is configured to determine whether the display task is within a validity period, and control the first displaying module 102 to repeatedly display the corresponding video resource when the display task is within the validity period.

In some implementations, the first displaying module 102 may further display, in response to a display trigger signal sent by another display terminal, a video resource corresponding to the display task defined in the task list corresponding to the received display trigger signal.

Figure 17:
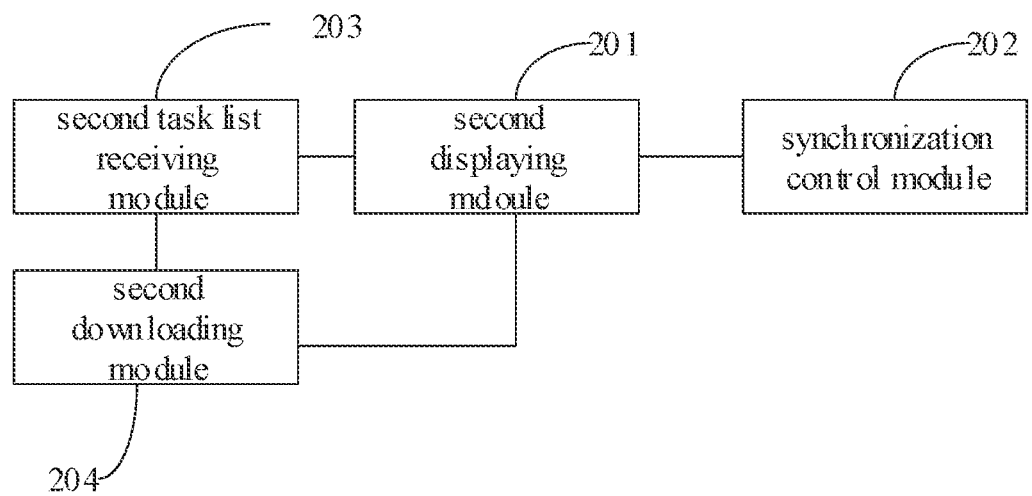
FIG. 17 is a block diagram of another implementation of the display terminal provided by the present disclosure.

As an aspect of the present disclosure, a display terminal is further provided, and as shown in FIG. 17, the display terminal may include a second displaying module 201, where the second displaying module 201 is configured to display a video resource defined by a display trigger signal in response to the display trigger signal sent by the display terminal serving as the host in a display task, where the current display terminal and the display terminal serving as the host belong to a same spliced screen.

In some implementations, the display terminal may further include a synchronization control module 202, where the synchronization control module 202 is configured to, in response to synchronization information sent by the display terminal serving as the host in the display task, display the video resource currently being displayed in synchronization with the display terminal serving as the host.

In some implementations, the display terminal may further include a second task list receiving module 203, where the second task list receiving module 203 is configured to receive a task list, the task list includes at least one display task, and the display task includes identification information of a video resource corresponding to the display task, a start time of the display task, and type information of the display task, where the type of the display task includes stand-alone displaying and splicing displaying, and when the type of the display task is splicing playing, the task list further includes identification information of a display terminal serving as a host in the display task and identification information of a display terminal serving as a slave in the display task, and the display terminal serving as the host and the display terminal serving as the slave belong to a same spliced screen.

In some implementations, the display terminal may further include a second downloading module 204, where the second downloading module 204 is configured to download the video resource according to the task list.

In some implementations, the second playing module 201 is configured to display, according to a third target task, a video resource corresponding to a display task defined by the third target task, where the third target task is a display task with the type of stand-alone displaying in the task list received by the current display terminal.

Figure 18:
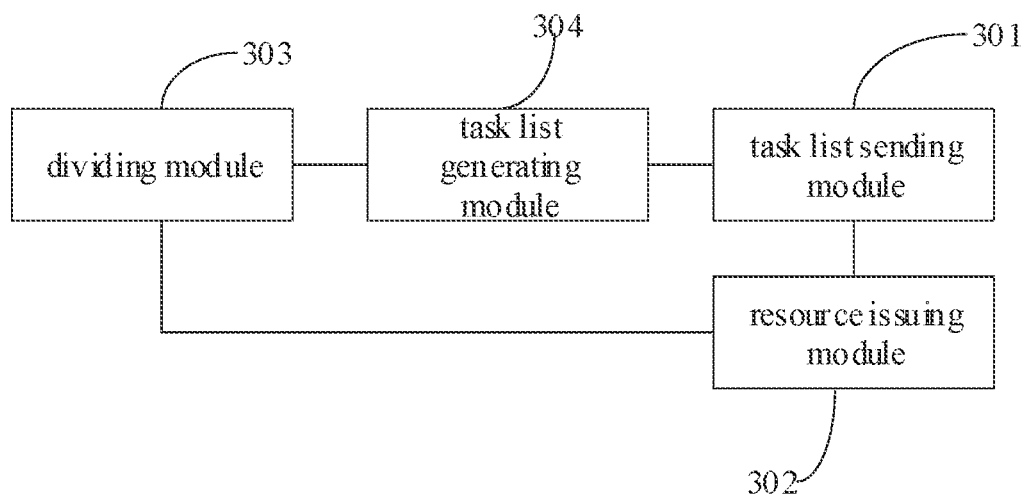
FIG. 18 is a block diagram illustrating an implementation of a server provided by the present disclosure.

As an aspect of the present disclosure, there is provided a server, as shown in FIG. 18, including:

a task list sending module 301, where the task list sending module 301 is configured to send a task list to a plurality of display terminals in a same spliced screen. The task list includes at least one display task, the display task includes identification information of a video resource corresponding to the display task, a start time of the display task and type information of the display task, the type of the display task includes stand-alone displaying and splicing displaying, when the type of the display task is splicing displaying, the task list further includes identification information of a display terminal serving as a host in the display task and identification information of a display terminal serving as a slave in the display task, and the display terminal serving as the host and the display terminal serving as the slave belong to the same spliced screen.

In some implementations, the server may further include a resource issuing module 302, where the resource issuing module 302 is configured to send the video resource to the display terminal in response to a download request.

In some implementations, the server may further include a dividing module 303 and a task list generating module 304.

The dividing module 303 is configured to divide an initial video resource to obtain video resources corresponding to splicing displaying, and the task list generating module 304 is configured to generate a task list according to the display task corresponding to stand-alone displaying and the display task corresponding to splicing displaying.

In some implementations, the server may further include a validity period determining module 305, where the validity period determining module 305 is configured to determine a validity period for each display task; and the generated task list carries information of the validity period.

It will be understood that the above implementations are merely exemplary implementations employed to illustrate principles of the present disclosure, and the present disclosure is not limited thereto. It will be apparent to those ordinary skilled in the art that various changes and modifications can be made therein without departing from the spirit and scope of the present disclosure, and these changes and modifications are to be considered within the scope of the present disclosure.

The invention claimed is:

1. A display method, comprising:
receiving a task list, wherein the task list comprises at least one display task, the display task comprises identification information of a video resource corresponding to the display task, a start time of the display task and type information of the display task, the type of the display task comprises splicing displaying, the task list further comprises identification information of a display terminal serving as a host in the display task with the type of splicing displaying and identification information of a display terminal serving as a slave in the display task with the type of splicing displaying, and the display terminal serving as the host and the display terminal serving as the slave in the same display task belong to a same spliced screen;
displaying the video resource defined by a first target task according to the first target task, wherein the first target task is a display task, in which identification information of the display terminal serving as the host is the same as that of a current display terminal, in all display tasks of the task list;
sending a display trigger signal to the display terminal serving as the slave in the first target task, wherein the display trigger signal is used for controlling the display terminal receiving the display trigger signal to display the video resource defined by the first target task; and
after sending the display trigger signal to the display terminal serving as the slave in the first target task, periodically sending synchronization information to the display terminal serving as the slave in the first target task so as to control the display terminal serving as the slave to display synchronously with the current display terminal, wherein a period of sending the synchronization information is less than a predetermined time interval, and the synchronization information includes progress information of displaying of the current display terminal.

2. The display method according to claim 1, wherein the display terminals in the same spliced screen form a local area network, and during sending the display trigger signal to the display terminal serving as the slave in the display task defined by the first target task, the display trigger signal is broadcast in the local area network.

3. The display method according to claim 1, further comprising:
after receiving the task list, downloading and storing the video resource, to be displayed, defined by the task list, wherein different video resources have different identification information, wherein the task list is a task list sent by a server, and during downloading and storing the video resource, to be displayed, defined by the task list, the video resource to be displayed is downloaded from the server through Internet.

4. The display method according to claim 1, wherein the type of the display task further includes stand-alone displaying, the display method further comprising:
displaying the video resource corresponding to the display task defined by a second target task according to the second target task, wherein the second target task is a display task with the type of stand-alone displaying in the task list received by the current display terminal.

5. The display method according to claim 1, wherein the information carried by the task list further includes a validity period of each display task, and the display method further comprises:
after the display task is executed, judging whether the display task is in the validity period;
in response to that the display task is within the validity period, repeatedly executing the display task.

6. The display method according to claim 1, further comprising:
in response to the display trigger signal sent by another display terminal, displaying the video resource corresponding to the display task defined by the task list corresponding to the received display trigger signal.

7. A display terminal, comprising:
one or more first processors;
a first storage module configured to store an executable program that, when called, causes the one or more first processors to perform the display method of claim 1;
a first I/O interface coupled between the first processor and the first storage module so as to realize information interaction between the first processor and the first storage module.

8. A spliced screen, comprising a plurality of display terminals each being the display terminal of claim 7.

9. A display method, comprising:
in response to a display trigger signal sent by a display terminal serving as a host in a display task, displaying a video resource defined by the display trigger signal, wherein a current display terminal and the display terminal serving as the host belong to a same spliced screen; and
in response to synchronization information periodically sent by the display terminal serving as the host in the display task, displaying the video resource, currently being displayed, in synchronization with the display terminal serving as the host, wherein the synchronization information includes a displaying progress of the display terminal serving as the host displaying the video resource, and during displaying the video resource, currently being displayed, in synchronization with the display terminal serving as the host, adjusting the displaying progress to be the same as that of the display terminal serving as the host.

10. The display method according to claim 9, further comprising:

receiving a task list, wherein the task list comprises at least one display task, the display task comprises identification information of a video resource corresponding to the display task, a start time of the display task and type information of the display task, the type of the display task comprises splicing displaying, the task list further comprises identification information of the display terminal serving as the host in the display task with the type of splicing displaying and identification information of a display terminal serving as a slave in the display task with the type of splicing displaying, and the display terminal serving as the host and the display terminal serving as the slave belong to a same spliced screen.

11. The display method according to claim 10, further comprising:

after receiving the task list, downloading the video resource according to the task list.

12. The display method according to claim 10, wherein the type of the display task further comprises stand-alone displaying, the display method further comprising:

displaying the video resource corresponding to the display task defined by a third target task according to the third target task, wherein the third target task is a display task with the type of stand-alone displaying in the task list received by the current display terminal.

\* \* \* \* \*